United States Patent
Young et al.

(10) Patent No.: US 12,521,766 B1
(45) Date of Patent: *Jan. 13, 2026

(54) SMART SYSTEMS AND METHODS FOR IDENTIFICATION AND PROCESSING OF SPENT LITHIUM CELLS

(71) Applicant: Li Industries, Inc., Pineville, NC (US)

(72) Inventors: David Young, Boston, MA (US); Xu Han, Merion Station, PA (US); Zheng Li, Charlotte, NC (US); Panni Zheng, Charlotte, NC (US)

(73) Assignee: Li Industries, Inc., Pineville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,826

(22) Filed: Feb. 10, 2025

Related U.S. Application Data

(63) Continuation of application No. 18/356,191, filed on Jul. 20, 2023, which is a continuation of application No. 17/433,266, filed as application No. PCT/US2020/019910 on Feb. 26, 2020, now Pat. No. 11,747,290.

(Continued)

(51) Int. Cl.
| | |
|---|---|
| *B07C 5/34* | (2006.01) |
| *B07C 5/342* | (2006.01) |
| *G01N 23/223* | (2006.01) |
| *H01M 10/54* | (2006.01) |

(52) U.S. Cl.
CPC .............. *B07C 5/34* (2013.01); *B07C 5/3422* (2013.01); *G01N 23/223* (2013.01); *H01M 10/54* (2013.01); *G01N 2223/04* (2013.01); *G01N 2223/076* (2013.01); *G01N 2223/085* (2013.01); *G01N 2223/1016* (2013.01); *G01N 2223/304* (2013.01); *G01N 2223/305* (2013.01);

(Continued)

(58) Field of Classification Search
None
See application file for complete search history.

(56) References Cited

U.S. PATENT DOCUMENTS

| | | | |
|---|---|---|---|
| 4,350,442 A | 9/1982 | Arild et al. | |
| 6,519,315 B2 * | 2/2003 | Sommer, Jr. ......... | G01N 23/223 378/45 |

(Continued)

FOREIGN PATENT DOCUMENTS

| | | |
|---|---|---|
| AU | 2010202919 A1 | 9/2011 |
| CN | 1193558 A | 9/1998 |

(Continued)

OTHER PUBLICATIONS

Machine translation of EP 1132152 A2 cited in the IDS filed Feb. 19, 2025 (Year: 2001).*

(Continued)

*Primary Examiner* — Thomas R Artman
(74) *Attorney, Agent, or Firm* — COOLEY LLP

(57) ABSTRACT

A method includes using machine learning to classify and sort energy storage devices based on at least one of the detected chemical or physical properties. In some embodiments, the method can include irradiating an energy storage device with an input radiation and detecting the output radiation reflected or backscattered by the energy storage device. The method may further include detecting a physical property of the energy storage device.

31 Claims, 12 Drawing Sheets

Related U.S. Application Data

(60) Provisional application No. 62/880,744, filed on Jul. 31, 2019, provisional application No. 62/811,342, filed on Feb. 27, 2019.

(52) U.S. Cl.
CPC . *G01N 2223/306* (2013.01); *G01N 2223/615* (2013.01); *G01N 2223/643* (2013.01)

(56) References Cited

U.S. PATENT DOCUMENTS

| | | | |
|---|---|---|---|
| 6,888,917 B2 * | 5/2005 | Sommer, Jr. ............ | B07C 5/365 378/57 |
| 7,198,865 B2 * | 4/2007 | Sloop ................. | H01M 50/627 429/49 |
| 7,902,299 B2 | 3/2011 | Kerr et al. | |
| 8,067,107 B2 | 11/2011 | Sloop et al. | |
| 8,497,030 B2 | 7/2013 | Sloop | |
| 8,823,329 B2 | 9/2014 | Sloop et al. | |
| 8,846,225 B2 | 9/2014 | Sloop | |
| 9,287,552 B2 | 3/2016 | Sloop | |
| 9,484,606 B1 | 11/2016 | Sloop et al. | |
| 9,785,851 B1 | 10/2017 | Torek et al. | |
| 9,825,341 B2 | 11/2017 | Sloop | |
| 10,014,562 B2 | 7/2018 | Sloop | |
| 10,207,296 B2 * | 2/2019 | Garcia ................. | B07C 5/34 |
| 10,333,183 B2 | 6/2019 | Sloop | |
| 10,697,909 B2 | 6/2020 | Loeffler et al. | |
| 10,710,119 B2 * | 7/2020 | Kumar ................ | G06N 3/08 |
| 11,278,937 B2 * | 3/2022 | Kumar ................ | B07C 5/34 |
| 11,394,062 B2 | 7/2022 | Sloop | |
| 11,747,290 B2 * | 9/2023 | Young ................. | B07C 5/34 209/576 |
| 2001/0022830 A1 * | 9/2001 | Sommer, Jr. ............ | B07C 5/346 378/45 |
| 2002/0094058 A1 | 7/2002 | Kaiser et al. | |
| 2003/0147494 A1 * | 8/2003 | Sommer, Jr. ......... | G01N 23/223 378/58 |
| 2003/0186110 A1 | 10/2003 | Sloop | |
| 2005/0078786 A1 * | 4/2005 | Sommer, Jr. ............ | B07C 5/365 378/49 |
| 2005/0244704 A1 * | 11/2005 | Sloop ................. | H01M 50/691 429/49 |
| 2008/0137807 A1 | 6/2008 | Yukisada et al. | |
| 2008/0279329 A1 * | 11/2008 | Sommer, Jr. ............ | B07C 5/365 378/45 |
| 2010/0146761 A1 | 6/2010 | Sloop | |
| 2010/0203366 A1 | 8/2010 | Sloop | |
| 2011/0222654 A1 * | 9/2011 | Sommer .............. | G01N 23/223 378/45 |
| 2015/0108989 A1 * | 4/2015 | Sloop ................. | B07C 5/342 324/426 |
| 2017/0014868 A1 | 1/2017 | Garcia, Jr. et al. | |
| 2018/0031497 A1 | 2/2018 | Parks et al. | |
| 2018/0243800 A1 | 8/2018 | Kumar et al. | |
| 2018/0358480 A1 | 12/2018 | Stradins et al. | |
| 2019/0260100 A1 | 8/2019 | Sloop | |
| 2021/0143489 A1 | 5/2021 | Sloop et al. | |
| 2021/0304122 A1 | 9/2021 | Dattamajumdar et al. | |
| 2022/0016675 A1 | 1/2022 | Kumar et al. | |
| 2022/0057345 A1 * | 2/2022 | Young ................. | B07C 5/344 |
| 2022/0271356 A1 | 8/2022 | Sloop et al. | |
| 2022/0352572 A1 | 11/2022 | Sloop | |
| 2023/0070883 A1 | 3/2023 | Sloop et al. | |
| 2023/0198041 A1 | 6/2023 | Sloop et al. | |
| 2023/0395889 A1 | 12/2023 | Yang et al. | |
| 2023/0411725 A1 | 12/2023 | Yang et al. | |
| 2024/0027376 A1 * | 1/2024 | Young ................. | B07C 5/344 |
| 2025/0162007 A1 | 5/2025 | Zheng et al. | |

FOREIGN PATENT DOCUMENTS

| | | | | |
|---|---|---|---|---|
| CN | 102066912 | A | 5/2011 | |
| CN | 102519919 | A | 6/2012 | |
| CN | 103149372 | A | 6/2013 | |
| CN | 106040618 | A | 10/2016 | |
| CN | 106537305 | A | 3/2017 | |
| CN | 107857066 | A | 3/2018 | |
| CN | 107886500 | A | 4/2018 | |
| CN | 107921484 | A | 4/2018 | |
| CN | 108136445 | A | 6/2018 | |
| DE | 19610093 | A1 | 9/1997 | |
| DE | 10010556 | A1 * | 9/2001 | ........... B07C 5/3416 |
| EP | 0795919 | A2 | 9/1997 | |
| EP | 1009049 | A2 | 6/2000 | |
| EP | 1132152 | A2 | 9/2001 | |
| EP | 1132992 | B1 | 4/2007 | |
| JP | 5969685 | B1 | 8/2016 | |
| RU | 2204811 | C1 | 5/2003 | |
| WO | WO-9217791 | A1 * | 10/1992 | ............. B03B 9/061 |
| WO | WO-1992017791 | A1 | 10/1992 | |
| WO | WO-1994019838 | A1 | 9/1994 | |
| WO | WO-0008700 | A1 * | 2/2000 | ............... B07C 5/12 |
| WO | WO-2000008700 | A1 | 2/2000 | |
| WO | WO-2007014532 | A1 | 2/2007 | |
| WO | WO-2009105713 | A1 | 8/2009 | |
| WO | WO-2010014637 | A1 | 2/2010 | |
| WO | WO-2010077982 | A2 | 7/2010 | |
| WO | WO-2011109831 | A2 | 9/2011 | |
| WO | WO-2014152650 | A1 | 9/2014 | |
| WO | WO-2014153570 | A2 | 9/2014 | |
| WO | WO-2016022858 | A1 | 2/2016 | |
| WO | WO-2017011835 | A1 | 1/2017 | |
| WO | WO-2017142644 | A2 | 8/2017 | |
| WO | WO-2018203055 | A1 | 11/2018 | |
| WO | WO-2020176627 | A1 * | 9/2020 | ............... B07C 5/34 |
| WO | WO-2020236513 | A1 | 11/2020 | |
| WO | WO-2021096990 | A1 | 5/2021 | |
| WO | WO-2023019224 | A1 | 2/2023 | |
| WO | WO-2024020336 | A1 | 1/2024 | |

OTHER PUBLICATIONS

Dai et al., "EverBatt: A Closed-loop Battery Recycling Cost and Environmental Impacts Model," Argonne National Laboratory, 2019, 88 pages.

Journal of Electronics and Information Technology, vol. 35, No. 1, 2013, 27 pages.

Lipu et al. "A review of state of health and remaining useful life estimation methods for lithium-ion battery in electric vehicles: Challenges and recommendations." Journal of Cleaner Production., 2018, vol. 205, pp. 115-133.

Wang et al., "Battery Recycling Modeling," Argonne National Laboratory, Project ID #bat342, Jun. 19, 2018, 22 pages.

International Preliminary Report on Patentability for Application No. PCT/US2020/019910, dated Sep. 10, 2021, 8 pages.

International Preliminary Report on Patentability for Application No. PCT/US2023/070311, dated Dec. 18, 2024, 7 pages.

International Search Report and Written Opinion for Application No. PCT/US2020/019910, dated Jun. 10, 2020, 8 pages.

International Search Report and Written Opinion for PCT Application No. PCT/US2023/070311, dated Nov. 9, 2023, 14 pages.

Notice of Allowance for U.S. Appl. No. 17/433,266, dated Jul. 12, 2023, 8 pages.

Office Action for CN Application No. 202080016298.9, dated Feb. 23, 2023, 24 pages. with English translation.

Office Action for CN Application No. 202080016298.9, dated Jun. 13, 2023, 21 pages with English translation.

Office Action for CN Application No. 202080016298.9, dated Nov. 6, 2023, 21 pages with English translation.

Office Action for CN Application No. 202080016298.9, dated Sep. 2, 2022, 17 pages with English translation.

Office Action for CN Application No. 202080016298.9, dated Sep. 3, 2024, 24 pages with English translation.

Office Action for EP Application No. 20763945.1, dated Aug. 23, 2024, 4 pages.

Office Action for EP Application No. 20763945.1, dated Dec. 23, 2022, 9 pages.

(56) References Cited

OTHER PUBLICATIONS

Office Action for EP Application No. 20763945.1, dated Oct. 4, 2022, 12 pages.
Office Action for IN Patent Application No. 202147034648, dated Apr. 1, 2024, 7 pages.
Office Action for U.S. Appl. No. 17/433,266, dated Dec. 16, 2022, 9 pages.
Office Action for U.S. Appl. No. 17/433,266, dated Mar. 28, 2023, 9 pages.
Office Action for U.S. Appl. No. 18/356,191, dated Apr. 24, 2025, 10 pages.
Office Action for U.S. Appl. No. 18/356,191, dated May 10, 2024, 10 pages.
Office Action for U.S. Appl. No. 18/356,191, dated Nov. 1, 2024, 10 pages.
Office Action for U.S. Appl. No. 19/030,227, dated Sep. 5, 2025, 16 pages.

\* cited by examiner

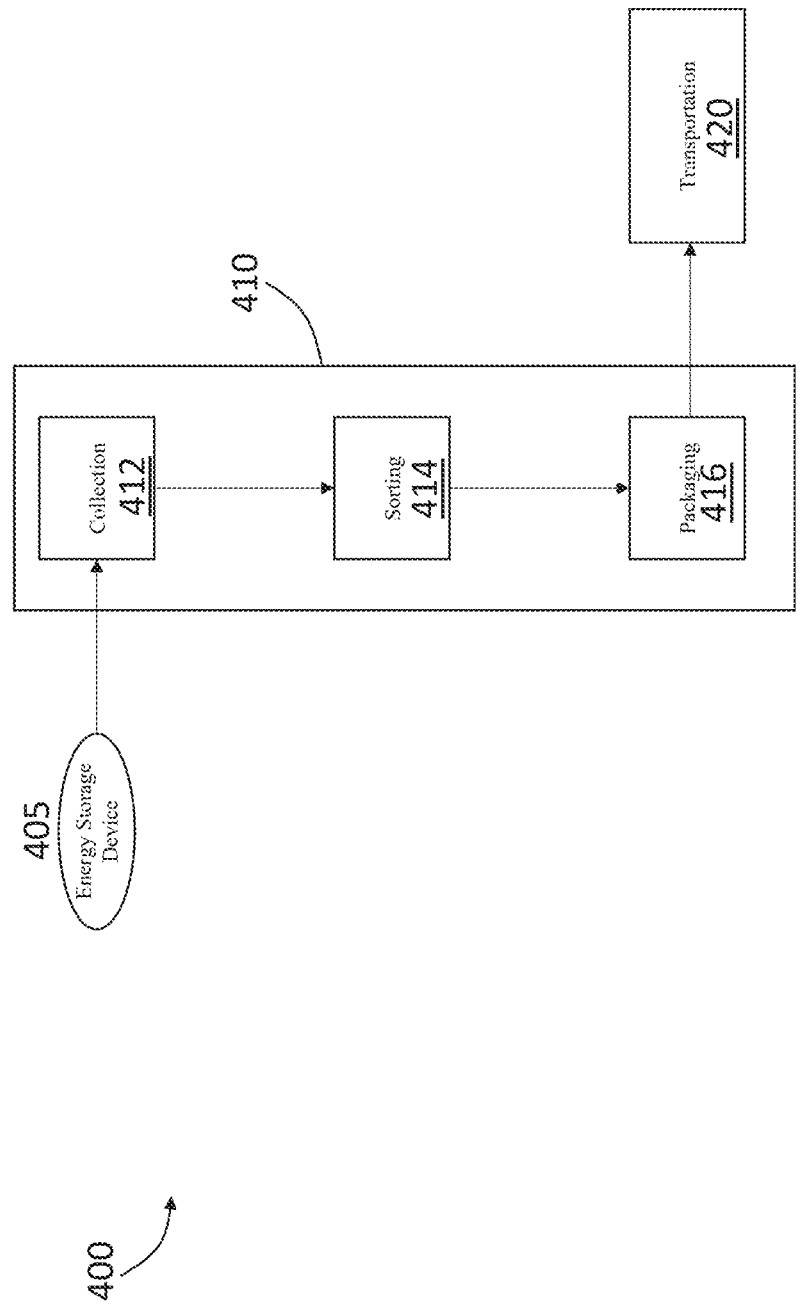

| Battery Sample | Battery Type | Battery Shape/Size | Battery Weight (g) | Elemental Analysis |
|---|---|---|---|---|
| 01 | Primary Zn-Mn | D8 | 135.8 | Fe 63.82%, Ni 35.86%, Co 0.15%, Mn 0.14% |
| 02 | Primary Zn-Mn | D8 | 135.4 | Fe 66.19%, Ni 30.9%, Ti 1.47%, Co 0.8%, Sn 0.28% |
| 03 | Primary Zn-Mn | AA | 24.2 | Fe 67.05%, Ni 29.9%, Co 0.77%, Si 0.63%, Ti 0.39%, S 0.52%, Sn 0.43% |
| 04 | Primary Zn-Mn | AA | 23.2 | Ni 51.84%, Fe 44%, Al 2.05%, Si 1.43%, Ti 0.29%, Co 0.22% |
| 05 | Primary Zn-Mn | AAA | 11.0 | Fe 64.54%, Ni 34.4%, Co 0.61%, Ti 0.29% |
| 06 | Rechargeable NiMH | AA | 21.4 | Ni 70.79%, Fe 23.06%, Co 1.63%, Ti 1.45%, Pd 1.09%, Au 0.82%, V 0.6%, P 0.57% |
| 07 | Rechargeable Li-Ion | Phone | 25.0 | Co 49.46%, Al 38.96%, S 5.78%, Fe 2.24%, Si 1.09%, Cu 0.79%, Ti 0.75%, Hf 0.27% |

FIG. 8

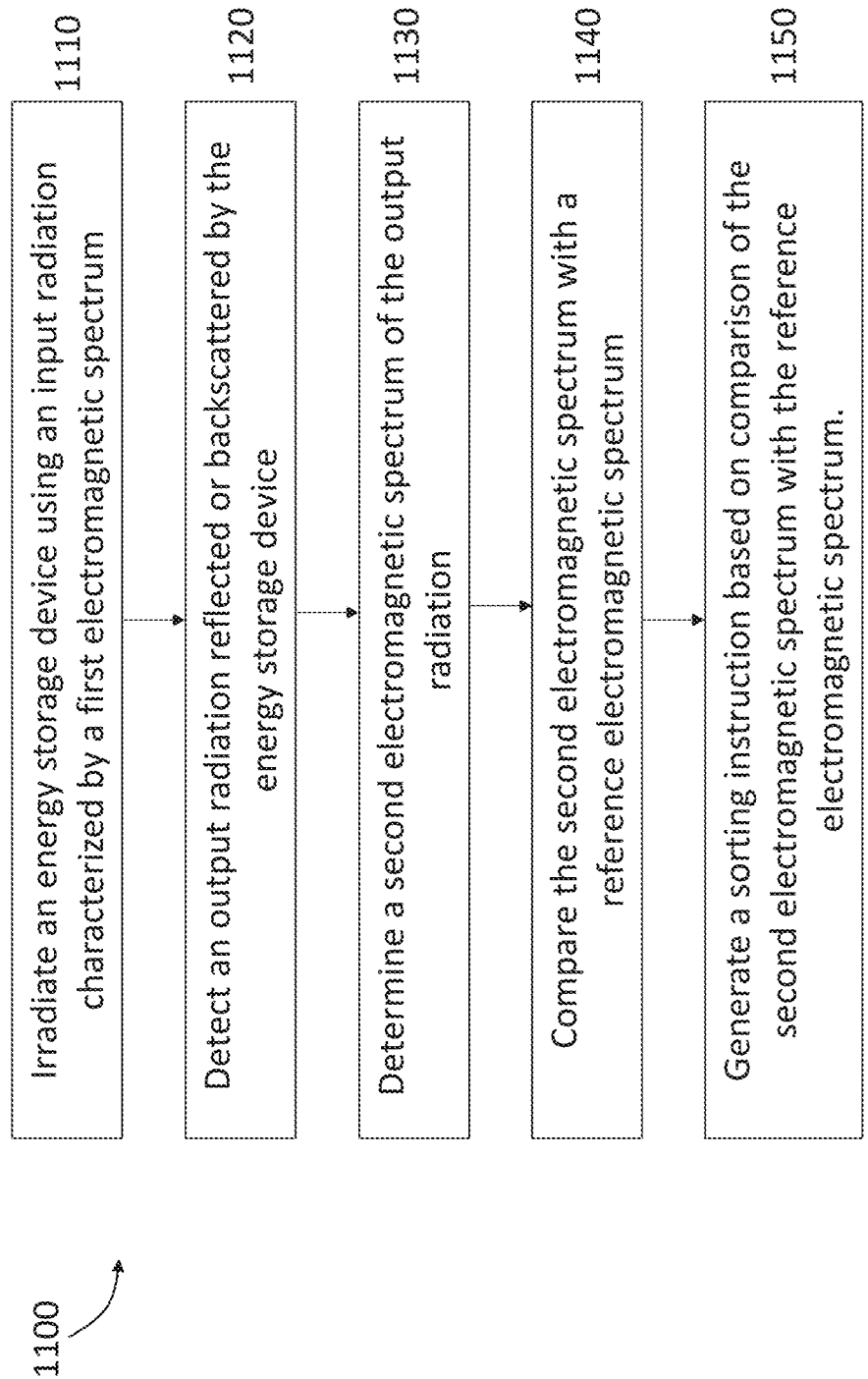

SMART SYSTEMS AND METHODS FOR IDENTIFICATION AND PROCESSING OF SPENT LITHIUM CELLS

CROSS-REFERENCE TO RELATED APPLICATIONS

This application is a continuation of U.S. application Ser. No. 18/356,191, filed Jul. 20, 2023, which is a continuation of U.S. application Ser. No. 17/433,266, filed Aug. 24, 2021, which is a U.S. National Stage Application under 35 U.S.C. § 371 of International Application No. PCT/US2020/019910, filed Feb. 26, 2020, which claims priority, under 35 U.S.C. § 119(e), to U.S. Application No. 62/811,342, filed Feb. 27, 2019, entitled "Automatic Collection-Sorting-Packaging System for Transporting End-of-Life Consumer Batteries", and U.S. Application No. 62/880,744, filed Jul. 31, 2019, entitled "Methods and Systems for Smart Battery Sorting," the contents of each of which are hereby incorporated herein by reference in their entireties.

FIELD OF THE INVENTION

This invention relates to apparatus, systems, and methods for collecting, sorting, and packaging energy storage devices and more particularly for collecting, sorting, and packaging batteries.

BACKGROUND

In the following discussion certain articles and processes will be described for background and introductory purposes. Nothing contained herein is to be construed as an admission of prior art. Applicant expressly reserves the right to demonstrate, where appropriate, that the articles and processes referenced herein do not constitute prior art under the applicable statutory provisions.

Collecting, sorting, and packaging are usually performed for the recycling or disposal of energy storage devices including lithium-ion batteries (LIBs), and other energy storage devices. End-of-life (EOL) LIBs or other LIB waste require a mode of collection that can be centralized or decentralized to gather LIBs for recycling or disposal. LIBs can then be sorted to separate LIBs from non-LIBs, as well as to separate different LIBs of different chemistries. Sorting end-of-life (EOL) LIBs based on material chemistries is beneficial for direct recycling of EOL LIBs. Current energy storage device sorting approaches cater more to the recycling of non-LIBs and usually treat LIBs as a monolithic category in the sorting process. Existing sorting processes are typically designed to sort a broad range of energy storage devices and have low efficiency in sorting LIBs.

Proper packaging can also be beneficial to the process of recycling or disposal. For example, EOL LIBs are considered to be hazardous waste by the U.S. government, and the U.S. Department of Transportation currently requires special packaging for LIBs undergoing transportation, which, in some cases, includes individual battery packaging.

Proper waste management methods can incentivize stakeholders in battery value chain and increase the EOL battery collection and recycling rate. Methods that increase the communication and coordination between different market players can be important to the efficiency and economics of the collection, sorting, and recycling processes. Therefore, a system that transmits data securely and safely between involved parties can greatly improve the overall methods and processes used in the collection, sorting, and recycling of batteries and other energy storage devices.

SUMMARY

Apparatus, systems, and methods are disclosed for sorting energy storage devices. In some embodiments, a method includes irradiating an energy storage device using an input radiation characterized by a first electromagnetic spectrum and detecting an output radiation reflected or backscattered by the energy storage device. The method also includes determining a second electromagnetic spectrum of the output radiation and comparing the second electromagnetic spectrum with a reference electromagnetic spectrum. The method further includes generating a sorting instruction based on comparison of the second electromagnetic spectrum with the reference electromagnetic spectrum.

In some embodiments, a system includes a radiation source configured to irradiate an energy storage device using an input radiation characterized by a first electromagnetic spectrum. The system also includes a detector configured to detect an output radiation reflected or backscattered by the energy storage device. The system also includes a compute device configured to determine a second electromagnetic spectrum of the output radiation and compare the second electromagnetic spectrum with a reference electromagnetic spectrum. The compute device is also configured to generate an instruction to sort the energy storage device based on comparison of the second electromagnetic spectrum with the reference electromagnetic spectrum.

BRIEF DESCRIPTION OF THE DRAWINGS

A person skilled in the art will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4 shows a schematic of a system for integrated collection, sorting, and packaging of energy storage devices, according to an embodiment.

FIG. 8 is a table showing examples of battery data and types that can be used for battery sorting, according to an embodiment.

FIG. 11 is a flowchart illustrating a method of sorting energy storage devices, according to an embodiment.

DETAILED DESCRIPTION

Figure 1:
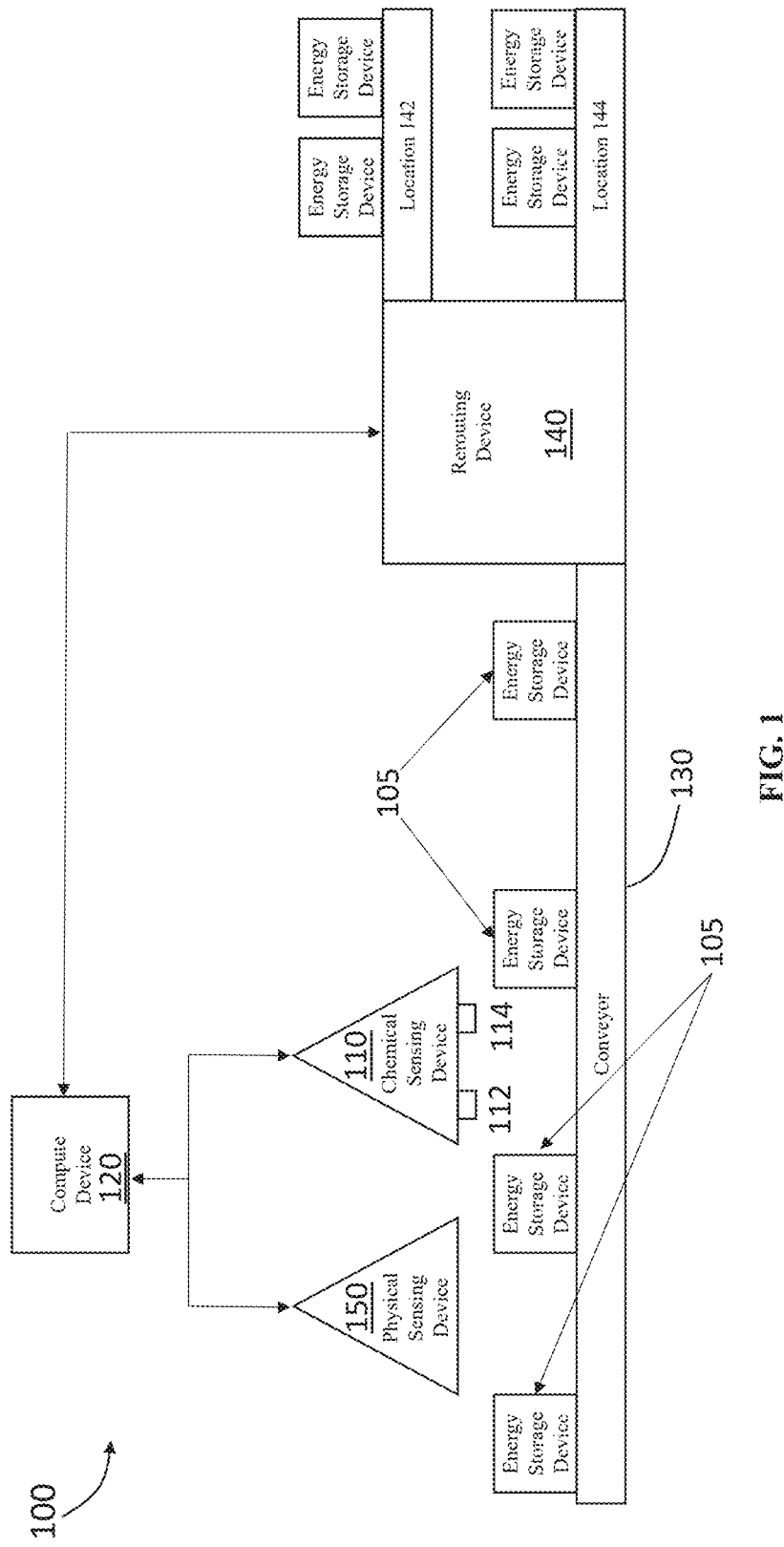
FIG. 1 shows a schematic of a system for sorting energy storages devices, according to an embodiment.

The following description is presented to enable one of ordinary skill in the art to make and use the invention and is provided in the context of a patent application and its requirements. Various modifications to the example embodiments and the genetic principles and features described herein will be readily apparent. The example embodiments are mainly described in terms of particular processes and systems provided in particular implementations. However, the processes and systems will operate effectively in other implementations. Phrases such as "example embodiment", "one embodiment", and "another embodiment" may refer to the same or different embodiments.

The example embodiments will be described with respect to methods and compositions having certain components. However, the methods and compositions may include more or fewer components than those shown, and variations in the arrangement and type of the components may be made without departing from the scope of the invention. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The example embodiments will also be described in the context of methods having certain steps. However, the methods and compositions operate effectively with additional steps and steps in different orders that are not inconsistent with the example embodiments. Thus, the present invention is not intended to be limited to the embodiments shown, but is to be accorded the widest scope consistent with the principles and features described herein and as limited only by appended claims.

It should be noted that as used herein and in the appended claims, the singular forms "a," "and," and "the" include plural referents unless the context clearly dictates otherwise. Thus, for example, reference to the result of "a measurement" may refers to the result of one or a combination of measurements, and reference to "a method" includes reference to equivalent steps and processes known to those skilled in the art, and so forth.

Where a range of values is provided, it is to be understood that each intervening value between the upper and lower limit of that range—and any other stated or intervening value in that stated range—is encompassed within the invention. Where the stated range includes upper and lower limits, ranges excluding either of those limits are also included in the invention.

Unless expressly stated, the terms used herein are intended to have the plain and ordinary meaning as understood by those of ordinary skill in the art. The following definitions are intended to aid the reader in understanding the present invention, but are not intended to vary or otherwise limit the meaning of such terms unless specifically indicated. All publications mentioned herein are incorporated by reference for the purpose of describing and disclosing the formulations and processes that are described in the publication and which might be used in connection with the presently described invention.

Those skilled in the art will recognize, or be able to ascertain using no more than routine experimentation, many equivalents to the specific embodiments of the invention described herein in the detailed description and figures. Such equivalents are intended to be encompassed by the claims.

For simplicity, in the present document certain embodiments are described with respect to use of certain methods. It will become apparent to one skilled in the art upon reading this disclosure that the invention is not intended to be limited to a specific use, and can be used for in a wide array of implementations.

Unless defined otherwise, all technical and scientific terms used herein have the same meaning as commonly understood by the ordinary person skilled in the art to which the embodiments pertain.

"Energy storage device" as used herein refers to any system, apparatus, or device that stores energy in the form of chemical, electrochemical, electrical, or other potential energy, which can be harvested or channeled for use. Energy storage devices include, but are not limited to, batteries, fuel cells, capacitors, and supercapacitors.

Many of the embodiments below reference to the terms "battery" or "lithium ion battery" or "LIB" in singular or plural form. In certain embodiments, these terms are used interchangeably with the term "energy storage device", and the apparatus, systems, and methods encompass all other energy storage devices.

The term "decentralized" and "decentralization" refer to the organization, reorganization, distribution, or redistribution of people, tools, functions, authorization, management, and storage without recourse to a central authority.

The term "smart contract" refers to a compute device function that triggers and executes automatically under circumstances during which the terms of a prearranged agreement between at least two transacting parties have been fulfilled.

The term "distributed ledger technology" or "DLT" refers to a database infrastructure that can be held, written, accessed, and managed by a number of nodes or participating compute devices across a network. "Blockchain" is one such DLT that utilizes packets of data called "blocks" to hold information about transactions, events, tasks. In blockchain, new blocks are recorded chronologically by the network and only when a node in the network fulfills certain conditions of the DLT's consensus mechanism (known as proof-of-work in blockchain).

Decentralized applications or "DApps" refer to applications, networks, or platforms such as blockchain, Holochain, Hashgraph, IOTA, Tangle, Solid, SAFE Network, or other similar decentralized applications, networks, or platforms that contain decentralized applications.

One process for battery sorting includes a manual process, in which trained personnel are placed along the conveyor belt and sort different types of batteries that are fed down onto the conveyor. The trained personnel sort batteries twice, the first time based on a broad categorization (e.g., rubbish, lithium, 6 volts, packs, bags, lead) and the second time based on chemistry (e.g., nickel metal hydride (NiMH), nickel cadmium (NiCd), lithium ion, or lithium). Such a process relies heavily on the training and capability of personnel to identify and sort batteries in an accurate and efficient manner.

Another process, also referred to as vision technology-assisted sorting, can be a more automated battery sorting process. This process relies on vision technology and artificial intelligence to separate batteries based on their label, size, shape, and weight. This process can have higher sorting efficiency and higher accuracy rate than the manual process and is designed to identify all cylindrical batteries up to D size and sort all 9V batteries into four classes: alkaline, NiMH, NiCd, and lithium. In addition, the vision technology helps with collecting data on batteries and feeding them into a machine learning process, which further optimizes the efficiency and accuracy of sorting.

One issue with the above two processes is that they are not designed to address specific needs of sorting that are particular to certain energy storage devices such as LIBs. Specifically, neither process can effectively separate energy storage devices based on their material chemistries. For example, the material chemistry of most LIBs is not easily identifiable from the label, size, shape, and/or weight of the battery itself. Moreover, even LIBs with the same type of material chemistry vary in shape and size. These differences in shape and size are nuanced, which makes it challenging to rely solely on vision technology to sort.

To address these challenges, systems, apparatus, and methods described herein employ a sorting process for the effective separation of energy storage devices based on a number of physical and chemical properties. Such a sorting process can, among other benefits, lead to the more efficient and effective recycling of energy storage devices. Given that these apparatus, systems, and methods are not particular to energy storage devices, the apparatus, systems, and methods described herein are also applicable to other sorting and separating applications.

The two methods described above of sorting energy storage devices, manual sorting and vision technology-assisted sorting, are usually inadequate for many of the applications requiring sorting by the chemical composition of the energy storage device. A smart sorting method that is able to sort by chemical composition of the energy storage device can facilitate the adoption of direct recycling as a primary approach for energy storage device recycling, more specifically for lithium ion battery (LIB) recycling. Direct LIB recycling can significantly reduce the production cost of cathode materials and mitigate the negative environmental effect of current LIB recycling methods. Specifically, it is suggested that the cost of producing recycled cathode materials through direct recycling method can be about 15% to about 43% lower than the production cost of virgin cathode materials (see, e.g., Argonne National Laboratory, "Battery Recycling Modeling" 2018, which is incorporated hereby by reference in its entirety). In addition, direct LIBs recycling is not only cheaper than alternative LIB recycling methods (e.g., pyrometallurgical or hydrometallurgical methods) but also significantly lower in $CO_2$ and $SO_x$ emission.

FIG. 1 shows a schematic of a system 100 for sorting energy storages devices, according to an embodiment. The system 100 includes a chemical sensing device 110 that has a radiation source 112 configured to irradiate an energy storage device 105 or a plurality of energy storage devices 105, using an input radiation characterized by a first electromagnetic spectrum. The chemical sensing device 100 also includes a detector 114 configured to detect an output radiation reflected or backscattered by the energy storage device 105. The system 100 also includes a compute device 120 configured to determine a second electromagnetic spectrum of the output radiation and compare the second electromagnetic spectrum with a reference electromagnetic spectrum. The compute device 120 is also configured to generate an instruction to sort the energy storage device 105 based on comparison of the second electromagnetic spectrum with the reference electromagnetic spectrum.

In some embodiments, the instruction generated by the compute device 120 is sent to a rerouting device 140 (also referred to as a sorting device 140), which is configured to implement the instruction and sort the energy storage device 105 into different locations. FIG. 1 shows two locations 142 and 144 for illustrative purposes only. In some embodiments, the sorting device 140 can be configured to reroute energy storage devices 105 into more than two possible locations (e.g., three locations, four locations, five locations, etc.).

In some embodiments, the system 100 includes a conveyor belt 130 to transport the energy storage devices 105 and facilitate the sorting process. In some embodiments, the conveyor belt 130 can operate at a capacity between one and ten batteries per minute. In some embodiments, the conveyor belt 130 can operate at a capacity between ten and one hundred batteries per minute. In some embodiments, the conveyor belt 130 can operate at a capacity between one hundred and one thousand batteries per minute.

In some embodiments, the chemical sensing device 110 includes X-ray fluorescence (XRF) spectroscopy. X-ray fluorescence spectroscopy uses X-rays generated from an excited source to irradiate a target. The target responds through the emission of X-ray spectra characteristic to certain chemical compositions. The X-ray spectra can be compared to the X-ray spectra of known chemical compositions to determine the chemical composition of the target. The penetration depth of X-rays can be large enough to penetrate through surface coatings, coverings, or other material, which provides the capability of identifying the chemical composition of the material of energy storage devices 105 beneath coatings, coverings, or other surface material.

In some embodiments, the chemical sensing device 110 includes absorption spectroscopy. In some embodiments, the chemical sensing device 110 includes ultraviolet-visible spectroscopy. In some embodiments, the chemical sensing device 110 includes X-ray absorption spectroscopy. In some embodiments, the chemical sensing device 110 includes ultraviolet-visible fluorescence spectroscopy. In some embodiments, the chemical sensing device 110 includes energy-dispersive X-ray spectroscopy. In some embodiments, the chemical sensing device 110 includes photoemission spectroscopy, such as X-ray photoelectron spectroscopy and/or ultraviolet photoelectron spectroscopy. In some embodiments, the chemical sensing device 110 includes projectional radiography by X-ray radiation. In some embodiments, the chemical sensing device 110 includes computed tomography (CT). In some embodiments, the chemical sensing device 110 includes Raman spectroscopy.

In some embodiments, the chemical sensing technology can be combined with physical sensing technology during the sorting process. Without being bound by any particular theory or mode of operation, the physical sensing technology measures and records data on the physical properties of the target (e.g., energy storage devices 105). Such data on the physical properties of the target can be used to increase the efficacy and/or accuracy of the sorting process when combined with chemical sensing technology.

As illustrated in FIG. 1, in some embodiments, the system 100 can include an optional chemical sensing device 150 to determine at least one datum (or attribute) of physical information of the energy storage devices 105. In these embodiments, the compute device 120 can be configured to generate the instruction of sorting the energy storage devices 105 based on the combination of chemical composition measurement acquired by the chemical sensing device 110 and the at least one datum of physical information measured by the physical sensing device 150.

In some embodiments, physical information that can be acquired by the physical sensing device 150 includes, but is not limited to, physical height, width, or thickness, weight, density, color, written information (e.g., information written on labels), visual patterns, or auditory characteristics. Sorting the energy storage devices or generating the sorting instruction can be conducted based on the chemical composition comparison and/or the physical information comparison. The physical information comparison can be conducted between the physical information acquired by the physical sensing device 150 and reference physical information, such as a database of known physical information standards. In some embodiments, the reference physical information can be derived from sources, such as public database, previously collected database of known samples, predictive algorithm, or other predictive or correlative software.

In some embodiments, the physical sensing device 150 includes a camera. In some embodiments, the camera can measure at least one physical dimension of the energy storage devices 105. In some embodiments, the camera can also visually record written information on the surface of the energy storage devices 105. In some embodiments, the camera can visually record the color of the energy storage devices 105. In some embodiments, the camera can visually record visual patterns on the surface of the energy storage devices 105. The patterns or written information, which can include, in whole or in part, radio frequency identification code, barcode, serial code, or written or pictorial labels detailing manufacturer, material, year of manufacture, or location of origin, on the surface of the energy storage device, can be used to deduce or identify certain information about the energy storage devices 105.

In some embodiments, the camera operates in the X-ray spectrum. In these embodiments, the camera can visually record patterns or components under the surface of the energy storage device.

In some embodiments, the physical sensing device 150 includes a mass sensor. The mass sensor can measure the mass of the energy storage devices 105. The mass sensor can, in combination with another physical sensing technology, such as a camera, measure the density of the energy storage devices 105.

In some embodiments, the chemical sensing device 110, the compute device 120, the sorting device 140, and the locations 142 and 144 form a first sorting stage, and the system 100 can further include one or more additional sorting stages. For example, a second sorting stage (not shown in FIG. 1) can be disposed at location 142 to further sort energy storage devices 105 that are rerouted to the location 142 by the sorting device 140. In some embodiments, the second sorting stage can be substantially similar to the first sorting stage. For example, the second sorting stage can include a second chemical sensing device, a second compute device, and a second sorting device. In some embodiments, the first sorting stage and the second sorting stage can use the same chemical sensing technology and/or the physical sensing technology. In some embodiments, the first sorting stage and the second sorting stage can use different chemical sensing technologies and/or different physical sensing technologies. In some embodiments, a third sorting stage can be disposed at the end of the second location 144. In some embodiments, additional sorting stages can be included into the system 100 to form a cascade sorting system.

In some embodiments, the system 100 further includes a packaging subsystem (not shown in FIG. 1; see, e.g., FIG. 4) configured to package energy storage devices 105 after sorting. In some embodiments, the packaging subsystem can be disposed at or after the locations 142 and 144, where the energy storage devices 105 can be packaged. The packaging subsystem can also include one or more packaging materials and one or more packaging devices for packaging the energy storage devices 105. In some embodiments, the packaging material can include insulating materials (e.g., plastic), paper, nonconductive tapes, or combination thereof. In some embodiments, the packaging subsystem is configured to individually wrap each energy storage device 105.

In some embodiments, the packaging subsystem can be configured to package the energy storage devices 105 so as to prevent the contact between different energy storage devices 105. In some embodiments, the packaging subsystem can be configured to package the energy storage devices 105 so as to prevent electrical contact between the positive and negative leads of one energy storage device 105. In some embodiments, the packaging subsystem can be configured to package the energy storage devices 105 so as to prevent electrical contact among leads from different energy storage devices 105.

In some embodiments, the packaging subsystem is configured to implement an automated application of packaging materials. In some embodiments, the packaging subsystem is used by one or more personnel to implement manual applications of packaging materials. In some embodiments, the packaging subsystem can be configured to implement a hybrid of automated and manual applications of packaging materials.

In some embodiments, the system 100 further includes a collection subsystem (not shown in FIG. 1; see, e.g., FIG. 4) configured to collect the energy storage devices 105 for subsequent sorting. In some embodiments, the collection subsystem includes a receiving device (e.g., slot, a hole, or a receptacle) configured to receive the energy storage devices 105, which can then be transferred to conveyor belt 130 for sorting via a slide or a chute. In some embodiments, the collection subsystem can also include components from the sorting system such that the collection and sorting processes contain a temporal overlap, which would allow for sorting to commence as soon as the energy storage device 105 is received in the collection subsystem. In some embodiments, the collection subsystem can include a user interface.

In some embodiments, the sorting system as illustrated in FIG. 1, the collection subsystem, and the packaging subsystem form an integrated system configured to efficient and streamlined processing of energy storage devices 105. The processing includes a one-stop service of collection, sorting, and packaging. In some embodiments, the integrated system includes a receptacle housing a collection subsystem, a sorting subsystem (e.g., shown in FIG. 1), and a packaging subsystem, as described herein. In some embodiments, a machine learning method can be used to assist in the integrated collection, sorting, and packaging of energy storage devices. In some embodiments, the system for integrated collection, sorting, and packaging is connected to at least one device, server, or other system.

The apparatuses, methods, and systems described herein can be implemented, in all or in part, as computer executable instructions on computer-readable media. As understood by a person skilled in the art, the various steps of the apparatuses, methods, and systems described herein may be implemented as various blocks, operations, routines, tools, modules and techniques, which in turn may be implemented in hardware, firmware, software, or any combination of hardware, firmware, and/or software. In certain embodiments, hardware implementations can include but are not limited to a custom integrated circuit (IC), an application specific integrated circuit (ASIC), a field programmable logic array (FPGA), a programmable logic array (PLA), etc. In other embodiments, when implemented as software, the software may be stored in any computer readable medium known in the art, including, but not limited to, a solid-state disk, a magnetic disk, an optical disk, or other storage medium, in a RAM or ROM or flash memory of a computer, processor, hard disk drive, thumb drive, optical disk drive, or tape drive. In one embodiment, the software may be delivered to a user or a computing system via any delivery method known in the art, including but not limited to over a communication channel such as the internet, a wireless connection, a satellite connection, a telephone line, a computer readable disk, local area network, wide area network, or other transportable computer storage mechanism.

One set of embodiments provides for a suitable computing system environment known in the art to implement the apparatuses, methods, and systems described herein, including but not limited to mobile phones, laptops, personal computers, server computers, multiprocessor systems, microprocessor-based systems, set top boxes, programmable consumer electronics, network PCs, minicomputers, mainframe computers, cloud computing environments, and distributed computing environments that include any of the above systems or devices, etc. In some embodiments, the steps of the apparatuses, methods, and systems described herein are implemented via computer-executable instructions such as program modules, including but not limited to routines, programs, objects, components, data structures, etc. that perform particular tasks or implement particular abstract data types. In one embodiment, the methods and systems are practiced in a distributed computing environment, where tasks are performed by remote processing devices that are linked through a communications network. In one embodiment, the systems, methods, and apparatuses are practiced in an integrated computing environment. In both integrated and distributed computing environments, program modules may be located in both local and/or remote computer storage media, including memory storage devices.

Thus, one set of embodiments provides a computer-readable medium having computer executable instructions for determining the sorting or sorting decision.

Another set of embodiments provides a computer-readable medium having computer executable instructions for performing spectral analysis of the energy storage device to determine the spectral characteristics of the energy storage device.

Another set of embodiments provides a computer-readable medium having computer executable instructions for the execution of the method of chemical composition comparison described above and/or the method of physical information comparison described above.

In some embodiments, the system 100 (or other systems described herein) utilizes a machine learning classification method to process the sorting decision. Data can be previously collected to develop a classification model for the machine learning classification method. The classification model can be tested to ensure the accuracy of the classification model in identifying and sorting the energy storage device based on chemical composition. The classification model can be updated as necessary for reasons including, but not limited to, improving accuracy or accounting for new energy storage devices.

In some embodiments, the machine learning classification method utilizes k-nearest neighbors (k-NN). In some embodiments, the machine learning classification method utilizes a decision tree. In some embodiments, the machine learning classification method utilizes logistic regression. In some embodiments, the machine learning classification method utilizes naïve Bayes. In some embodiments, the machine learning classification method utilizes principle component analysis. In some embodiments, the machine learning classification method utilizes feature selection.

In some embodiments, the classification model is stored directly in the system 100, i.e., the system 100 can utilize the classification model directly. In some embodiments, the classification model can be stored in a central location. In these embodiments, the classification model can be made available to be downloaded to the system 100.

In some embodiments, the datum generated from the chemical sensing device 110 and/or the physical sensing device 150 can be uploaded to a server that stores the classification model. The server can be configured to process the uploaded data using the machine learning classification to produce the sorting decision. The sorting decision is then downloaded by the system 100 and utilized by the system 100 (e.g., to control the sorting device 140 to implement the sorting decision). In some embodiments, the server includes a cloud server, and the system 100 is configured to implement cloud computing using a cloud computing service (e.g., Amazon Web Services, Azure, Google) or an Industrial Internet of Things (IIOT) service (e.g., General Electric Predix, Siemens Mindsphere).

In some embodiments, the system 100 can be connected to safety, quality, production, materials resource planning, accounting, logistics, waste management, or other enterprise software. The system 100 can also output data to be used in the safety, quality, production, materials resource planning, accounting, logistics, waste management, or other enterprise software. In some embodiments, the system 100 can receive data from the safety, quality, production, materials resource planning, accounting, logistics, waste management, or other enterprise software to be utilized in the sorting decision process, for maintenance purposes, or other purposes.

In some embodiments, the system 100 can be connected to a DApp or utilizes a DApp on a decentralized network. The use of a DApp can, for example, protect the security of data and provide peer-to-peer interactions or transactions between parties involved in battery collection, transportation, sorting, recycling, manufacturing, distribution, and governance. In some embodiments, the system 100 can be configured to send and receive at least one datum to or from a decentralized network. The system 100 can make use of a DLT to store, access, and write at least one datum that is immutable and secure. The system 100 can allow for the storage, access, and writing of at least one datum by various parties involved in battery collection, transportation, sorting, recycling, manufacturing, distribution and governance.

Figure 9:
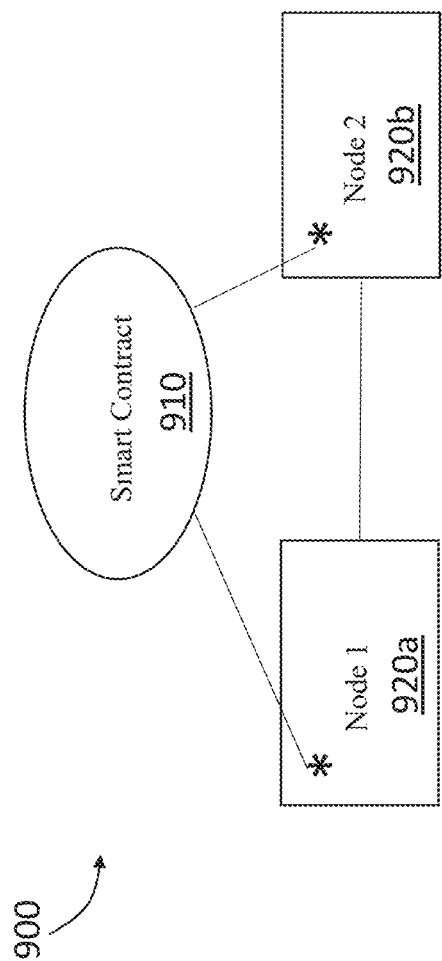
FIG. 9 illustrates an example of a peer-to-peer connection between two nodes on a decentralized waste management application, according to an embodiment.

In some embodiments, the system 100 can be configured to use a smart contract to create interactions and agreements between these parties (see, e.g., FIG. 9). For example, a smart contract can be created between a governing body and a battery collector that automatically compensates the battery collector after a certain number of batteries are collected.

In some embodiments, a DApp can be used to create interactions between different stakeholders in the LIB or energy storage device industry. Each participant can interact with any other via such a decentralized application or using a decentralized network for various activities such as to form partnerships, initiate smart contracts, transact, or share information (see, e.g., FIG. 10).

In some embodiments, a DApp can be used to incentivize the recycling of batteries. Such incentives can include compensation of battery consumers to return EOL batteries to collection devices, tax subsidies, or compensation by regulatory bodies to promote battery recycling, compensation to battery transporters to optimize collection or distribution routes, rewards for sorting battery accuracy, compensation or subsidies to battery manufacturers that use recycled battery material, or other similar incentives.

In some embodiments, a DApp can be used to track information about batteries or other energy storage devices. These batteries can have unique identifiers or signatures that allow for the easy identification in locations such as collection units, manufacturers, sorters, recyclers, and by other such as governing bodies or consumers. A DApp can enable the efficient tracking of this information through the life-cycle of the battery while also keeping the information secure and safe, as well as participants, owners, or temporary holders of the battery secure and anonymous.

Many modifications and variations can be made in the materials, methods, and kits described herein without departing from the spirit and scope of the invention. Accordingly, it should be understood that the apparatuses, methods, and systems described herein are illustrative only and are not limiting upon the scope of the invention.

The following examples are put forth so as to provide those of ordinary skill in the art with a complete disclosure and description of how to make and use the present invention, and are not intended to limit the scope of what the inventors regard as their invention, nor are the examples intended to represent or imply that the experiments below are all of or the only experiments performed. It will be appreciated by persons skilled in the art that numerous variations and/or modifications may be made to the invention as shown in the specific embodiments without departing from the spirit or scope of the invention as broadly described. It should also be appreciated that the examples provide enabling guidance on the use of the combined features of the disclosure to apply such tools, systems and methods to other uses. The present embodiments are, therefore, to be considered in all respects as illustrative and not restrictive.

The examples can be implemented in certain embodiments by computers or other processing devices incorporating and/or running software, where the methods and features, software, and processors utilize specialized methods to analyze data.

Efforts have been made to ensure accuracy with respect to numbers used, but some experimental errors and deviations should be accounted for. Unless indicated otherwise, parts are parts by weight, molecular weight is weight average molecular weight, temperature is in degrees centigrade, and pressure is at or near atmospheric.

Example 1

The example pertains to the sorting of batteries. The example utilizes two systems, each of which includes an industrial camera, a weight sensor, and an XRF analyzer to collect battery features such as width, length, height, weight, and chemical composition. The XRF analyzer can effectively penetrate most the cover of pouch cell LIBs because the cover is usually made of thin plastics or polymer-laminated aluminum film. Accordingly, the XRF can accurately measure the composition of heavy chemical elements in the cathode material of EOL LIBs. Collecting data on the chemical composition can be beneficial for sorting EOL LIBs based on their cathode material chemistry.

The data collected through the industrial camera, weight sensor, and XRF analyzer can be used as training data to develop a classification model used in the machine learning technique. The classification model can then be downloaded onto the system or made available as a web service through an HOT platform to all the equipment which are registered on the platform. Data can be sent from the equipment to the HOT platform once EOL batteries are fed into the equipment and the HOT platform can analyze the data and return sorting results based on its classification model.

The first system separates LIBs from non-LIBs. The second system sorts LIBs based on their cathode material chemistries, such as lithium cobalt oxide (abbreviated as LCO, in general format $LiCoO_2$), lithium mixed transition metal oxide (abbreviated as NMC, in more general format $LiNi_aMn_bCo_cA_dO_2$, where A=Al, Zr, Mg, etc., a+b+c+d is equal to about 1), and lithium iron phosphate (abbreviated as LFP, in general format $LiFePO_4$). Both systems utilize the sorting decisions made to send batteries to different locations along a multi-path conveyor to be grouped together by similar chemical compositions. In some embodiments, the second system can be disposed at the output location of the first system where LIBs are rerouted.

Figure 2:
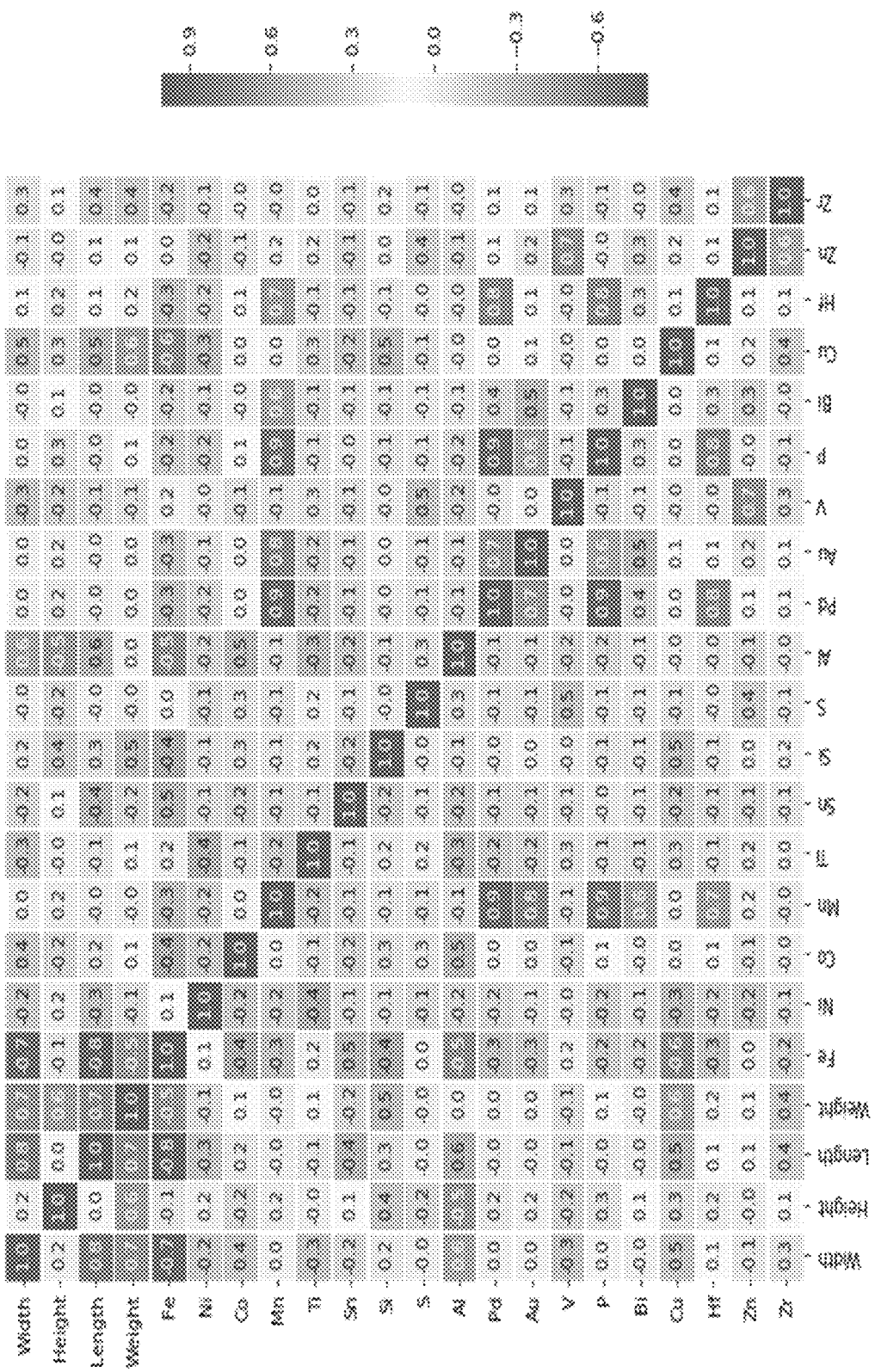
FIG. 2 illustrates an example of a correlation matrix used in the development of a machine learning method for optimizing variables used in sorting systems, according to an embodiment.

FIG. 2 illustrates an example of a correlation matrix used in the development of a machine learning method for optimizing variables used in sorting systems, according to an embodiment. To develop the classification model used in the machine learning method, a sample of 46 batteries are measured for width, height, length, weight, and chemical composition. To ensure a parsimonious classification model, all battery features are grouped into variable sets and a correlation matrix is developed. The feature selection method is utilized to reduce battery features into the eight most significant features. A classification method is created and optimized based on iterating various algorithmic techniques.

Figure 3:
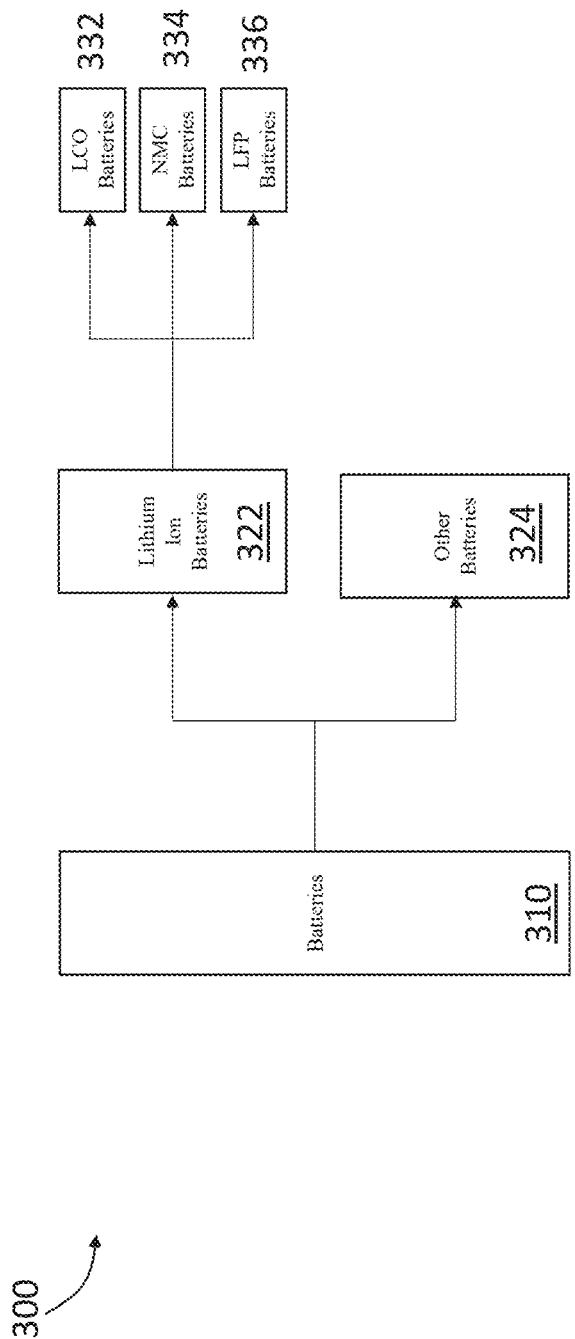
FIG. 3 shows a schematic of a two-step system for sorting batteries, according to an embodiment.

FIG. 3 shows a schematic of a two-step system 300 for sorting batteries, according to an embodiment. In the system 300, input batteries 310 are sorted into LIBs 322 and other batteries 324 in the first stage of sorting. The second stage of sorting is used to further sort LIBs 322 into different categories based on the chemical compositions. For example, as illustrated in FIG. 3, the second sorting stage can be configured to sort LIBs into lithium cobalt oxide (LCO) batteries 332, lithium mixed transition metal oxide (NMC) batteries 334, and lithium iron phosphate (LFP) batteries 336. For illustrative purposes only, three types of LIBs 322 are shown in FIG. 3. In practice, the second sorting stage can be configured to sort LIBs 322 into more than three categories.

Example 2

FIG. 4 shows a schematic of a system 400 for integrated collection, sorting, and packaging of energy storage devices 405, according to an embodiment. The system 400 includes an integrated unit 410, which further includes a collection stage 412 (also referred to as a collection subsystem 412), a sorting stage 414 (also referred to as a sorting subsystem 414), and a packaging stage 416 (also referred to as a packaging subsystem 416). In some embodiments, the collection stage 412 includes a receptacle (not shown in FIG. 4) to receive energy storage devices 405 and transfer the received energy storage devices 405 to the sorting stage 414, where the energy storage devices 405 are divided into different categories (e.g., in terms of their chemical compositions). The packaging stage 416 is configured to package the sorted energy storage devices 405, after which a transportation unit 420 can be used to transport the packaged energy storage devices 405 to desired destinations.

In some embodiments, at least some of the energy storage devices 405 are collected, sorted, and packaged for transportation to a recycling plant. In some embodiments, at least some of the energy storage devices 405 are collected, sorted, and packaged for transportation to be discarded. In some embodiments, at least some of the energy storage devices 405 are collected, sorted, and packaged for transportation to be reused.

Figure 5A:
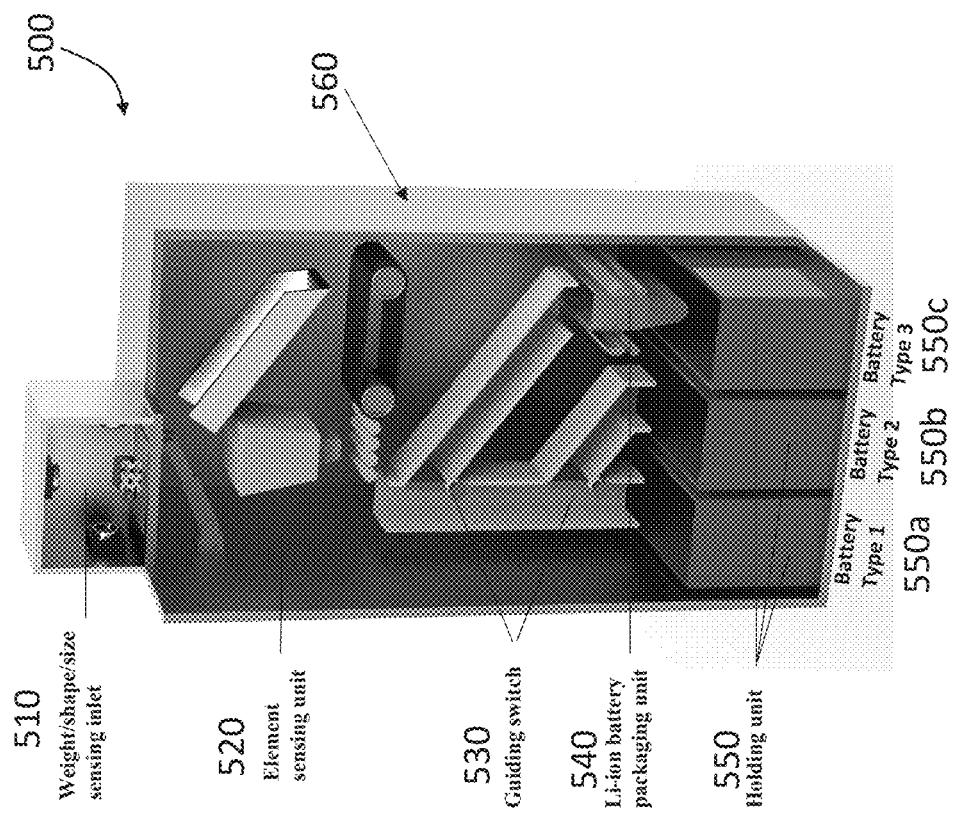
FIGS. 5A and 5B illustrate a system for integrated collection, sorting, and packaging of energy storage devices, according to an embodiment.
Figure 5B:
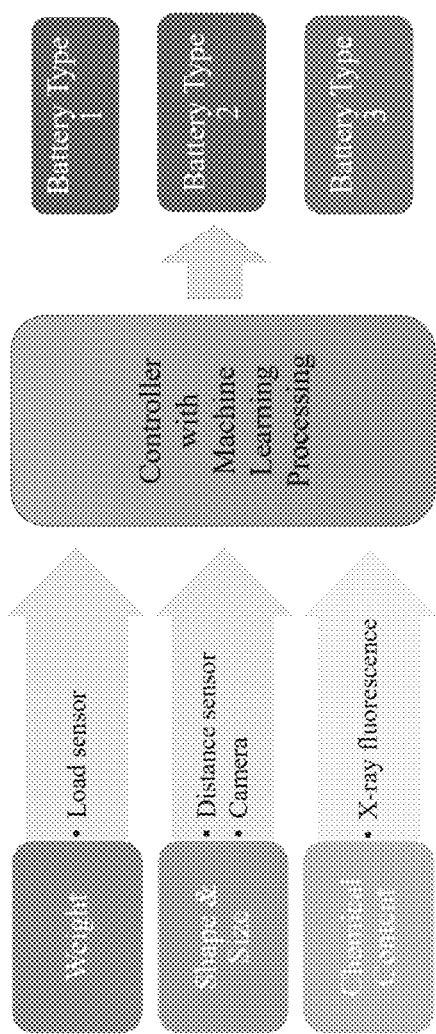

FIGS. 5A and 5B illustrate a system 500 for integrated collection, sorting, and packaging of energy storage devices, according to an embodiment. The system 500 includes an inlet 510 to receive energy storage devices. The inlet 510 includes at least one sensor, such as a weight sensor, a shape sensor, a size sensor, or a combination thereof. An element sensing unit 520 is used in the system 500 to determine the chemical composition (or elemental composition) of the energy storage devices.

The system 500 also includes a guiding switch 530 configured for rerouting the energy storage devices into different holding units 550a, 550b, and 550c (collectively referred to as holding units 550). Three holding units 550 are shown in FIG. 5 for illustrative purposes only. In some embodiments, the system 500 can include more than three holding units. In some embodiments, a packaging unit 540 is disposed before one holding unit 550c configured to receive LIBs and configured to package the LIBs before they reach the holding unit 550c. In some embodiments, as illustrated in the cross-sectional view in FIG. 5A, the system 500 includes a housing 560 that is configured to substantially enclose the element sensing unit 520, the guiding switch 530, the packaging unit 540, and the holding units 550.

The packaging unit 540 in the system 500 is configured to package the energy storage devices for safe transportation. In some embodiments, the packaging unit 540 is configured to package each energy storage device individually. In some embodiments, the packaging unit 540 is configured to package together multiple energy storage devices of the same type. In some embodiments, the packaging unit 540 is configured to use a flexible packaging material, such as plastic film, tape, or sheet. In some embodiments, the packaging unit 540 can be disposed prior to the guiding switches 530. In some embodiments, at least one packaging unit 540 is used to package at least one of the battery types after sorting.

FIG. 5B illustrates an example process of making sorting decisions in the system 500 shown in FIG. 5A, according to an embodiment. The system 500 can use a controller to make a sorting decision based on, e.g., at least one datum from the at least sensor or sensing unit. As illustrated in FIG. 5B, the weight of the energy storage devices can be determined by a load sensor. The shape and/or size of the energy storage devices can be determined by a distance sensor and/or a camera. The chemical composition of the energy storage devices can be determined by an XRF spectrometer. The data acquired by these sensors are sent to a controller configured to implement a machine learning method based on the received data. The output of the machine learning method includes an instruction to categorize a given energy storage device into one of the three types.

In some embodiments, the system 500 includes a user interface (e.g., operatively coupled with the inlet 510) configured to receive input information from, e.g., a user, an operator, or an administrator. In some embodiments, the input information can include information about the energy storage devices deposited into the inlet 510. In some embodiments, the input information can include information about the identity of the party that deposits the energy storage devices into the inlet 510. In some embodiments, the input information can include information about the collection-sorting-packaging system or incentives for depositing batteries into the collection-sorting-packaging system. In some embodiments, such information can be included in a smart contract as a battery ID.

In some embodiments, the controller is configured to alter the position of the guiding switch 530 to direct the energy storage devices into a corresponding holding unit 550a to 550c based on the datum generated by the sensing units (e.g., 510 and/or 520). In some embodiments, the datum can be used to determine the battery type. For example, a battery type may be LIB, alkaline, or nickel metal hydride (NiMH). In another example, a battery type may be a subset of LIBs such as LCO, NMC, and LFP.

Figure 6:
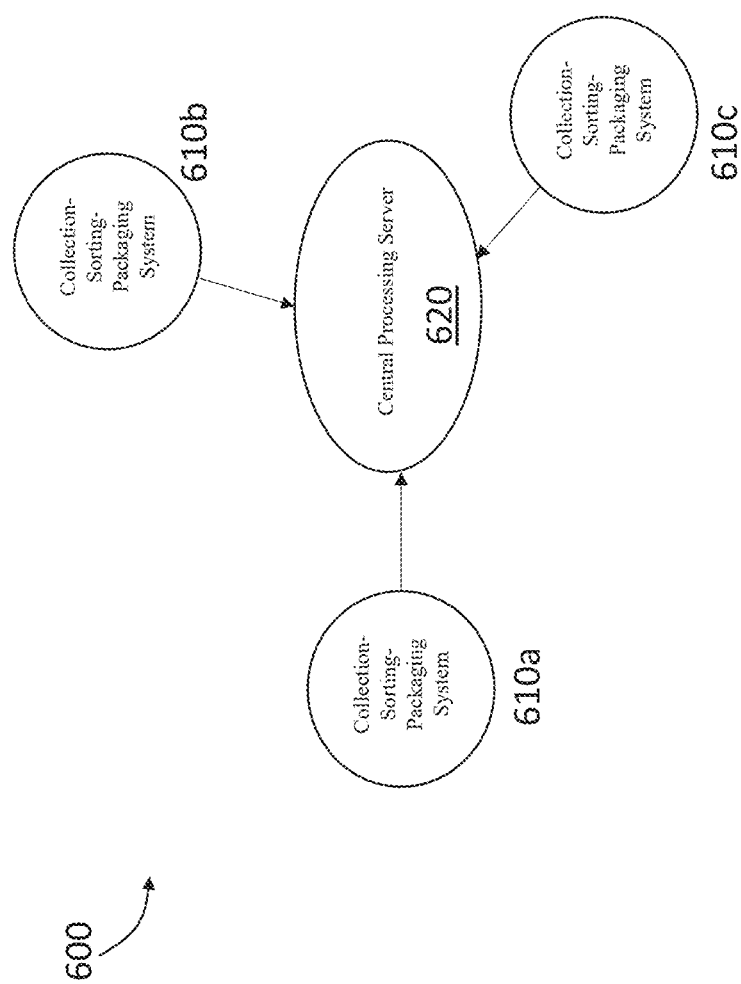
FIG. 6 illustrates an example architecture of multiple systems for collection, sorting, and packaging of energy storage devices, according to an embodiment.

FIG. 6 illustrates an example architecture 600 of multiple systems for collection, sorting, and packaging of energy storage devices, according to an embodiment. The architecture 600 includes three integrated systems 610a, 610b, and 610c (collectively referred to as integrated systems 610), each of which can be substantially similar to the system 500 shown in FIGS. 5A and 5B. The controller in each system 610a through 610c is communicatively coupled to a central processing server 620. In some embodiments, the central processing server 620 can be configured to receive data provided by the integrated systems 610 and implement a machine learning method to make sorting decision for the integrated systems 610. In some embodiments, the central processing server 620 includes a remote server and the computation can be conducted on a cloud-based platform.

In some embodiments, this central processing server 620 is configured to provide instructions to the controller in each integrated system 610a to 610c. In some embodiments, the controller in each integrated system 610a to 610c is configured to transmit information, such as number and types of batteries processed, location, power level, damage reports, supply levels, or schedules, to the central processing server 620. In some embodiments, the architecture 600 can be used, for example, to collect, sort, and package energy storage devices for transportation and recycling and to coordinate with other systems that monitor, manage, or analyze transportation and recycling processes.

Figures 7A, 7B, 7C, 7D:
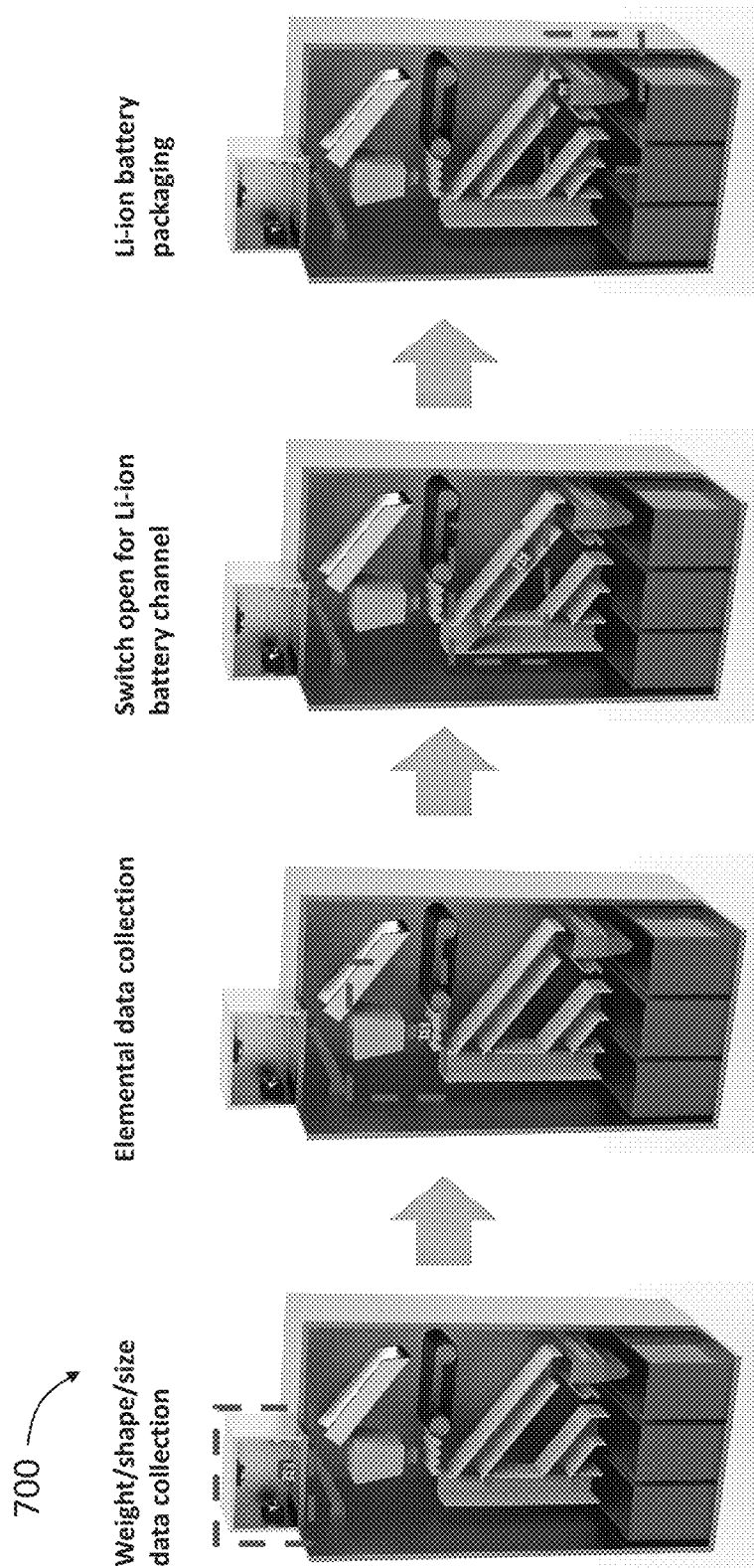
FIGS. 7A-7D illustrates a flow of process that can be implemented by the system shown in FIG. 5A, according to an embodiment.

FIGS. 7A-7D illustrate a flow of process 700 that can be implemented by the system shown in FIG. 5A, according to an embodiment. FIG. 7A shows that energy storage devices are deposited into the inlet, and weight, shape, and size data of the deposited energy storage devices are collected. The energy storage devices are then passed through a conveyance system to the elemental detector, which is configured to analyze and record the elemental constituents of the energy storage devices, as shown in FIG. 7B.

The weight, shape, size, and elemental data are fed into the controller, which determines the position of guide switches within the receptacle based on the type of the energy storage device determined by the controller's analytical system. These guide switches change the path of the energy storage devices to one of at least two holding units based on the type of the energy storage device, as shown in FIG. 7C. At least some of the sorted energy storage devices are then packaged prior to entering the holding unit, as shown in FIG. 7D. In some embodiments, only the LIBs are packaged and other types of batteries are not packaged.

FIG. 8 is a table showing examples of battery data and types that can be used for battery sorting, according to an embodiment. The battery shape, size, and weight information can be acquired, for example, by the physical sensing device (e.g., 150) described herein, and the elemental analysis can be determined by, for example, the chemical sensing device (e.g., 110) described herein. The type of the battery can then be determined based on the physical and/or the chemical information acquired by the sensing devices.

FIG. 9 illustrates a system 900 of a peer-to-peer connection between two nodes on a decentralized waste management application, according to an embodiment. The system 900 includes a first node 920a and a second node 920b, both of which are connected to a smart contract 910. Each node 920a or 920b can represent various types of participants on a decentralized waste management network. The star in each node represents the copy of the smart contract 910 running on each node. The participants can include government agencies that regulate the waste management and provides licenses, battery collectors, battery recyclers, battery transporters, battery consumers, or other stakeholders in the energy storage device value chain.

Figure 10:
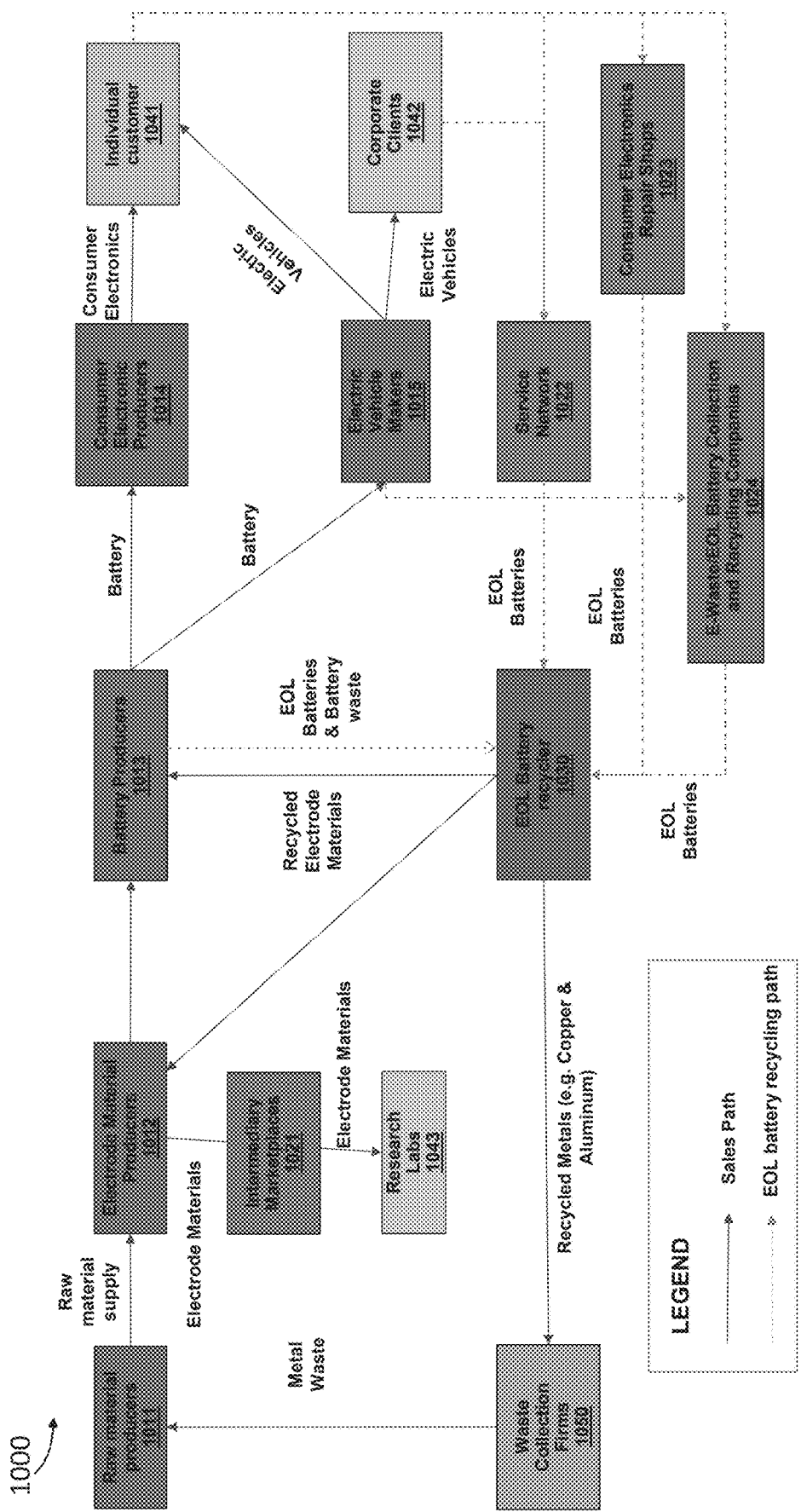
FIG. 10 illustrates a decentralized waste management system for processing end-of-life (EOL) batteries, according to an embodiment.

FIG. 10 illustrates a decentralized waste management system 1000 for processing EOL batteries, according to an embodiment. The system 1000 illustrates participants and examples of their potential interactions on an EOL battery on a decentralized waste management application or using a decentralized network. Each participant can interact with any other via such a decentralized application or using a decentralized network for various activities such as to form partnerships, initiate smart contracts, transact, or share information. Raw material producers 1011 include entities that mine and harvest raw materials and can supply these raw materials (e.g., elemental compounds) to electrode material producers 1012. Electrode material producers 1012 produce electrode materials, such as cathode materials and anode materials, and can supply electrode materials to battery producers 1013, intermediary marketplaces 1021 that distribute electrode materials, or directly to research laboratories 1043 that perform research on electrode materials and batteries. Battery producers 1013 can manufacture batteries and supply them (sometimes through a distributor) to consumer electronic producers 1014 or electric vehicle makers 1015, or in some cases battery producers 1013 may supply batteries (sometimes through a distributor) directly to an individual customer 1041. Consumer electronic producers 1014 and electric vehicle makers 1015 manufacture consumer electronics and electric vehicles, respectively, often utilizing or integrating a battery in the process and the finished product. These two manufacturers can supply consumer electronics and electric vehicles, respectively, (sometimes through a distributor) to an individual customer 1041. Electric vehicle makers 1015 can also sell electric vehicles to corporate clients 1042. Both individual customers and corporate clients that use electric vehicles and consumer electronics products containing a battery can sell, dispose, or otherwise deposit their product, when the product or battery reaches EOL, at either a service network 1022, which includes vehicle maintenance and repair shops, or a consumer electronics repair shop 1023. Both service networks 1022 and consumer electronics repair shops 1023 can dismantle and isolate the EOL or otherwise used battery from the rest of a product and directly send batteries to an EOL battery recycler 1030. Both service networks 1022 and consumer electronics repair shops 1023 can also send the battery or the battery contained in part of another product to an electronic waste (E-waste) or EOL battery collection and recycling company 1024. This E-waste or EOL battery collection and recycling company 1024 can isolate the EOL battery and send it to the EOL battery recycler 1030. The EOL battery recycler 1030 can dismantle and recycle various components of the battery. Some of the recycled or recovered battery components (e.g., copper and aluminum) can be sent to a waste collection firm 1050 that processes materials such as metals to be reused. Other recycled or recovered battery components (e.g., recycled electrode materials, recycled solvents, recycled electrolyte, recycled lithium salts) can be sent by the EOL battery recycler 1030 to battery producers 1013 or electrode materials producers 1012. Battery producers may also send battery waste to an EOL battery recycler 1030.

FIG. 11 is a flowchart illustrating a method 1100 of sorting energy storage devices, according to an embodiment. The method 1100 includes, at 1110, irradiating an energy storage device using an input radiation characterized by a first electromagnetic spectrum. The method 1100 also includes, at 1120, detecting an output radiation reflected or backscattered by the energy storage device. A second electromagnetic spectrum of the output radiation is determined at 1130. At 1140, the second electromagnetic spectrum is compared with a reference electromagnetic spectrum. The method 1100 further includes, at 1150, generating a sorting instruction based on comparison of the second electromagnetic spectrum with the reference electromagnetic spectrum.

In some embodiments, the input radiation includes an X-ray radiation. In some embodiments, the output radiation is generated via an XRF process. In these embodiments, the method 1100 can use an XRF spectrometer to determine the spectrum of the output radiation and accordingly the chemical composition of the energy storage device.

In some embodiments, the method 1100 further includes sorting the energy storage device based on the sorting instruction. In some embodiments, the method 1100 further includes packaging the energy storage device after sorting.

In some embodiments, the method 1100 further includes measuring at least one physical attribute of the energy storage device. In these embodiments, the sorting instruction can be generated based on: (1) the comparison of the second electromagnetic spectrum with the reference electromagnetic spectrum, and (2) comparison of the at least on physical attribute of the energy storage device with a reference physical attribute. In some embodiments, the physical sensing device includes a camera. In some embodiments, the physical sensing device includes a mass sensor.

In some embodiments, generating the sorting instruction includes generating the sorting instruction using a machine learning classification model. In some embodiments, generating the sorting instruction includes: (1) generating a first instruction to sort a plurality of energy storage devices into lithium ion batteries (LIBs) and other batteries; and (2) generating a second instruction to sort the LIBs.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the retention/delivery structure disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   detecting, via a physical sensing device, a physical property of a first plurality of energy storage devices;
   dividing, based on the physical property via a first sorting instruction generated by a machine learning classification model, the first plurality of energy storage devices into a second plurality of energy storage devices and a third plurality of energy storage devices, the second plurality of energy storage devices including lithium-ion batteries (LIBs) and the third plurality of energy storage devices including other batteries;
   detecting, via a chemical sensing device, an output radiation of the second plurality of energy storage devices including the lithium-ion batteries, the output radiation generated via an X-ray fluorescence (XRF) process;
   dividing, based on the output radiation indicative of their cathode material chemistries via a second sorting instruction generated by the machine learning classification model, the second plurality of energy storage devices including the lithium-ion batteries into a fourth plurality of energy storage devices and a fifth plurality of energy storage devices.

2. The method of claim 1, wherein detecting the output radiation includes:
   irradiating the second plurality of energy storage devices using an input radiation characterized by a first electromagnetic spectrum;
   sensing the output radiation reflected or backscattered by the second plurality of energy storage devices;
   determining a second electromagnetic spectrum of the output radiation that is characteristic of a chemical composition; and
   comparing the second electromagnetic spectrum characteristic of a chemical composition with a reference electromagnetic spectrum to identify the chemical composition of the energy storage device.

3. The method of claim 2, wherein the second sorting instruction generated by the machine learning classification model is based on comparison of the second electromagnetic spectrum with the reference electromagnetic spectrum.

4. The method of claim 2, wherein the input radiation includes an X-ray radiation.

5. The method of claim 1, further comprising:
   packaging at least one of the second plurality of energy storage devices, the fourth plurality of energy storage devices, or the fifth plurality of energy storage devices.

6. The method of claim 1, wherein the physical sensing device includes a camera.

7. The method of claim 1, wherein the physical sensing device includes a mass sensor.

8. A method, comprising:
   detecting, via a chemical sensing device, an output radiation of a first plurality of energy storage devices, the output radiation generated via an X-ray fluorescence (XRF) process;
   dividing, based on the output radiation property via a first sorting instruction generated by a machine learning classification model, the first plurality of energy storage devices into a second plurality of energy storage devices and a third plurality of energy storage devices, the second plurality of energy storage devices including lithium-ion batteries (LIBs) and the third plurality of energy storage devices including other batteries;
   detecting, via a physical sensing device, a physical property of the second plurality of energy storage devices including the lithium-ion batteries, indicative of their cathode material chemistries;
   dividing, based on the physical property via a second sorting instruction generated by the machine learning classification model, the second plurality of energy storage devices including the lithium-ion batteries into a fourth plurality of energy storage devices and a fifth plurality of energy storage devices.

9. The method of claim 8, wherein detecting the output radiation includes:
   irradiating the first plurality of energy storage devices using an input radiation characterized by a first electromagnetic spectrum;
   sensing the output radiation reflected or backscattered by the first plurality of energy storage devices;
   determining a second electromagnetic spectrum of the output radiation that is characteristic of a chemical composition; and
   comparing the second electromagnetic spectrum characteristic of a chemical composition with a reference electromagnetic spectrum to identify the chemical composition of the energy storage device.

10. The method of claim 9, wherein the first sorting instruction generated by the machine learning classification model is based on comparison of the second electromagnetic spectrum with the reference electromagnetic spectrum.

11. The method of claim 9, wherein the input radiation includes an X-ray radiation.

12. The method of claim 8, further comprising:
    packaging at least one of the second plurality of energy storage devices, the fourth plurality of energy storage devices, or the fifth plurality of energy storage devices.

13. The method of claim 8, wherein the physical sensing device includes at least one of a camera or a mass sensor.

14. The method of claim 8, further comprising:
    housing the second plurality of energy storage devices in a holding unit.

15. A system, comprising:
    a radiation source configured to irradiate an energy storage device using an input radiation characterized by a first electromagnetic spectrum;
    a detector configured to detect an output radiation reflected or backscattered by the energy storage device;
    a physical sensing device configured to detect a physical property of an energy storage device;
    a compute device configured to generate an instruction based on a machine learning classification model, to sort the energy storage device based on the output radiation and the physical property, wherein the instruction to sort the energy storage device includes:
a first instruction to sort a plurality of energy storage devices into lithium ion batteries (LIBs) and other batteries; and
a second instruction to further sort the sorted LIBs based on their cathode material chemistries.

16. The system of claim 15, wherein the radiation source includes an X-ray radiation source.

17. The system of claim 15, wherein the radiation source and the detector form at least a portion of an X-ray fluorescence (XRF) spectrometer.

18. The system of claim 15, further comprising:
a sorting device configured to receive the instruction and sort the energy storage device based on the instruction.

19. The system of claim 15, the sorting device includes a guiding switch.

20. The system of claim 19, further comprising:
a packaging device, disposed after the sorting device, configured to package the energy storage device.

21. The system of claim 15, further comprising:
an inlet configured to receive the energy storage device, wherein the physical sensing device is operatively coupled to the inlet.

22. A method, comprising:
detecting, via a physical sensing device, a physical property of a first plurality of energy storage devices;
dividing, based on the physical property via a first sorting instruction generated by a machine learning classification model, the first plurality of energy storage devices into a second plurality of energy storage devices and a third plurality of energy storage devices, the second plurality of energy storage devices including lithium-ion batteries (LIBs) and the third plurality of energy storage devices including other batteries;
detecting, via a chemical sensing device, an output radiation of the second plurality of energy storage devices including the lithium-ion batteries, the detecting the output radiation including:
irradiating the second plurality of energy storage devices using an input radiation characterized by a first electromagnetic spectrum;
sensing the output radiation reflected or backscattered by the second plurality of energy storage devices;
determining a second electromagnetic spectrum of the output radiation that is characteristic of a chemical composition; and
comparing the second electromagnetic spectrum characteristic of a chemical composition with a reference electromagnetic spectrum to identify the chemical composition of the energy storage device; and
dividing, based on the output radiation indicative of their cathode material chemistries via a second sorting instruction generated by the machine learning classification model, the second plurality of energy storage devices including the lithium-ion batteries into a fourth plurality of energy storage devices and a fifth plurality of energy storage devices.

23. The method of claim 22, wherein the first sorting instruction generated by the machine learning classification model is based on comparison of the second electromagnetic spectrum with the reference electromagnetic spectrum.

24. The method of claim 22, wherein the input radiation includes an X-ray radiation.

25. The method of claim 22, further comprising:
packaging at least one of the second plurality of energy storage devices, the fourth plurality of energy storage devices, or the fifth plurality of energy storage devices.

26. The method of claim 22, wherein the physical sensing device includes at least one of a camera or a mass sensor.

27. A method, comprising:
detecting, via a chemical sensing device, an output radiation of a first plurality of energy storage devices, the detecting the output radiation including:
irradiating the first plurality of energy storage devices using an input radiation characterized by a first electromagnetic spectrum;
sensing the output radiation reflected or backscattered by the first plurality of energy storage devices;
determining a second electromagnetic spectrum of the output radiation that is characteristic of a chemical composition; and
comparing the second electromagnetic spectrum characteristic of a chemical composition with a reference electromagnetic spectrum to identify the chemical composition of the energy storage device;
dividing, based on the output radiation property via a first sorting instruction generated by a machine learning classification model, the first plurality of energy storage devices into a second plurality of energy storage devices and a third plurality of energy storage devices, the second plurality of energy storage devices including lithium-ion batteries (LIBs) and the third plurality of energy storage devices including other batteries;
detecting, via a physical sensing device, a physical property of the second plurality of energy storage devices including the lithium-ion batteries, indicative of their cathode material chemistries;
dividing, based on the physical property via a second sorting instruction generated by the machine learning classification model, the second plurality of energy storage devices including the lithium-ion batteries into a fourth plurality of energy storage devices and a fifth plurality of energy storage devices.

28. The method of claim 27, wherein the second sorting instruction generated by the machine learning classification model is based on comparison of the second electromagnetic spectrum with the reference electromagnetic spectrum.

29. The method of claim 27, wherein the input radiation includes an X-ray radiation.

30. The method of claim 27, wherein the physical sensing device includes at least one of a camera or a mass sensor.

31. The method of claim 27, further comprising:
packaging at least one of the second plurality of energy storage devices, the fourth plurality of energy storage devices, or the fifth plurality of energy storage devices.

* * * * *